United States Patent
Liu et al.

(10) Patent No.: US 10,503,320 B2
(45) Date of Patent: Dec. 10, 2019

(54) ACTIVE FEEDFORWARD INTERFERENCE CANCELLATION TECHNIQUES FOR SENSOR ANALOG FRONT-END

(71) Applicant: SYNAPTICS INCORPORATED, San Jose, CA (US)

(72) Inventors: Chunbo Liu, San Jose, CA (US); Steve Chikin Lo, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/594,208

(22) Filed: May 12, 2017

(65) Prior Publication Data

US 2018/0329573 A1 Nov. 15, 2018

(51) Int. Cl.
*G06F 3/041* (2006.01)
*G06F 3/044* (2006.01)

(52) U.S. Cl.
CPC .......... *G06F 3/04182* (2019.05); *G06F 3/044* (2013.01); *G06F 3/0412* (2013.01); *G06F 3/0418* (2013.01); *G06F 3/0446* (2019.05)

(58) Field of Classification Search
CPC ........... G06F 3/041–04186; G06F 3/044–0448
See application file for complete search history.

(56) References Cited

U.S. PATENT DOCUMENTS

| | | | | |
|---|---|---|---|---|
| 2011/0109585 A1* | 5/2011 | Kwon | ................... | G06F 3/0418 345/174 |
| 2014/0015549 A1* | 1/2014 | Tu | .......................... | G06F 3/044 324/679 |
| 2014/0368467 A1* | 12/2014 | Park | ........................ | G06F 3/044 345/174 |
| 2015/0254491 A1* | 9/2015 | Mo | ........................ | G06F 3/0416 345/174 |
| 2016/0364061 A1* | 12/2016 | Zhao | ...................... | G02F 1/1333 |
| 2017/0075472 A1* | 3/2017 | Min | ........................ | G06F 3/0418 |
| 2017/0269773 A1* | 9/2017 | Suzuki | .................. | G06F 3/0416 |

OTHER PUBLICATIONS

Adel S. Sedra & Kenneth C. Smith, Microelectronic Circuits, 2004, Oxford University Press, 5th edition, pp. 68-70. (Year: 2004).*

* cited by examiner

*Primary Examiner* — David Tung
(74) *Attorney, Agent, or Firm* — Patterson + Sheridan, LLP

(57) ABSTRACT

Embodiments herein provide input devices that include a display panel on which a discrete capacitive sensor is disposed to form a capacitive sensing region. The capacitive sensor includes a plurality of sensor electrodes that are used to generate capacitive sensing signals indicating user interaction with the input device. Moreover, the input device includes analog interference detection circuitry for mitigating the negative impact of display noise on capacitive sensing. In one embodiment, the input device includes a reference circuit which is capacitively coupled to a display noise source and outputs a reference voltage that biases a charge integrator in a receiver channel used for capacitive sensing. In another embodiment, the input device includes a current conveyor coupled to an idle transmitter electrode of the sensor electrodes which outputs a correction current to a receiver channel to cancel a display noise current injected into the receiver channel.

14 Claims, 9 Drawing Sheets

ACTIVE FEEDFORWARD INTERFERENCE CANCELLATION TECHNIQUES FOR SENSOR ANALOG FRONT-END

FIELD OF THE INVENTION

Embodiments herein generally describe electronic devices and mitigating interference caused by display components on a capacitive sensor.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a display panel comprising a transparent conductive layer, a plurality of sensor electrodes disposed on the display panel where the plurality of sensor electrodes establishes a sensing region of the input device, a capacitor coupled at a first end to the transparent conductive layer, and a reference circuit coupled to a second end of the capacitor. The reference circuit is configured to measure noise generated by the transparent conductive layer and generate a reference voltage in response to the measured noise. The input device includes a first analog front end (AFE) coupled to a first sensor electrode of the plurality of sensor electrodes and to an output of the reference circuit in order to receive the reference voltage where the first AFE is configured to generate a capacitive measurement corresponding to the first sensor electrode using the reference voltage Another embodiment described herein is a processing system configured to couple to a display panel and to a plurality of sensor electrodes configured to establish a sensing region. The processing system includes a reference circuit configured to couple to a capacitor where the capacitor capacitively couples the reference circuit to a conductive layer in the display panel. The reference circuit is configured to measure noise generated by the conductive layer and generate a reference voltage in response to the measured noise. The processing system includes a first AFE coupled an output of the reference circuit in order to receive the reference voltage, wherein the first AFE is configured to couple to a first sensor electrode of the plurality of sensor electrodes where the first AFE is configured to generate a capacitive measurement corresponding to the first sensor electrode using the reference voltage.

Another embodiment described herein is a processing system configured to couple to a display panel and to a plurality of transmitter and receiver electrodes configured to establish a sensing region. The processing system includes a current conveyor selectively coupled to an idle transmitter electrode of the plurality of transmitter electrodes where the current conveyor is configured to output a correction current based on noise injected onto the idle transmitter electrode and a first receiver configured to couple to a first receiver electrode of the plurality of receiver electrodes where an output of the current conveyor is coupled with an input of the first receiver such that the correction current mitigates a noise current injected onto the first receiver electrode.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
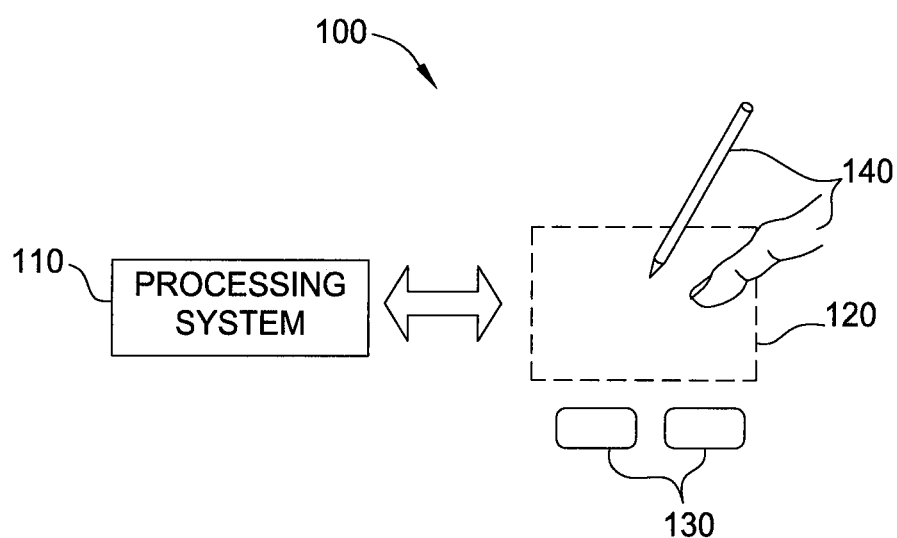
FIG. 1 is a block diagram of an exemplary system that includes an input device in accordance with an embodiment of this disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure provide input devices and methods that facilitate improved usability. In one embodiment, the input devices include a display panel on which a discrete capacitive sensor is disposed to form a capacitive sensing region. The capacitive sensor includes a plurality of sensor electrodes that generate capacitive sensing signals indicating user interaction with the input device. In one embodiment, the sensor electrodes are disposed on a cathode layer or anode layer in a light emitting diode (LED) display panel such that the sensor electrodes are capacitively coupled to the LED display panel. Current flows through the cathode or anode layer when the LED pixels are active (i.e., when current flows through corresponding LED diodes) which can cause interference or noise when using the sensor electrodes to perform capacitive sensing. In other embodiments, the sensor electrodes are disposed on a Vcom layer (common layer) in a liquid crystal display (LCD) panel. Because of a capacitive coupling between the conductive Vcom layer and the sensor electrodes, the voltage and current in the Vcom layer can negatively affect capacitive sensing.

In embodiments herein, the input device includes analog interference detection circuitry for mitigating the negative impact of display noise on capacitive sensing. In one embodiment, the input device includes a reference circuit which is capacitively coupled to a display noise source (e.g., a cathode/anode layer or Vcom layer). The reference circuit uses an interference sensor and a scaling circuit to output a reference voltage that biases a charge integrator in a receiver channel used for capacitive sensing. In another embodiment, the input device includes a current conveyor coupled to an idle transmitter electrode of the sensor electrodes. An output of the current conveyor is coupled to a receiver channel so that a correction current generated by the current conveyor prevents the display noise injected into the receiver channel from affecting the analog front end. In this manner, the input device can prevent display noise from affecting the analog front ends in the receiver channels when performing capacitive sensing.

Turning now to the figures, FIG. 1 is a block diagram of an exemplary input device 100, in accordance with embodiments described herein. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include I²C, SPI, PS/2, Universal Serial Bus (USB), Bluetooth®, RF, and IrDA protocols.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 may comprise one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or a pair of coils. Some combination of the magnitude, phase, and frequency of the currents may then be used to determine positional information.

In some capacitive implementations of the input device 100, voltage or current is applied to create an electric field. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object 140. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object 140 near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may transmit transmitter signals that are modulated relative to a reference voltage (e.g., system ground). Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes). Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators/mechanisms (not shown), etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments described herein are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
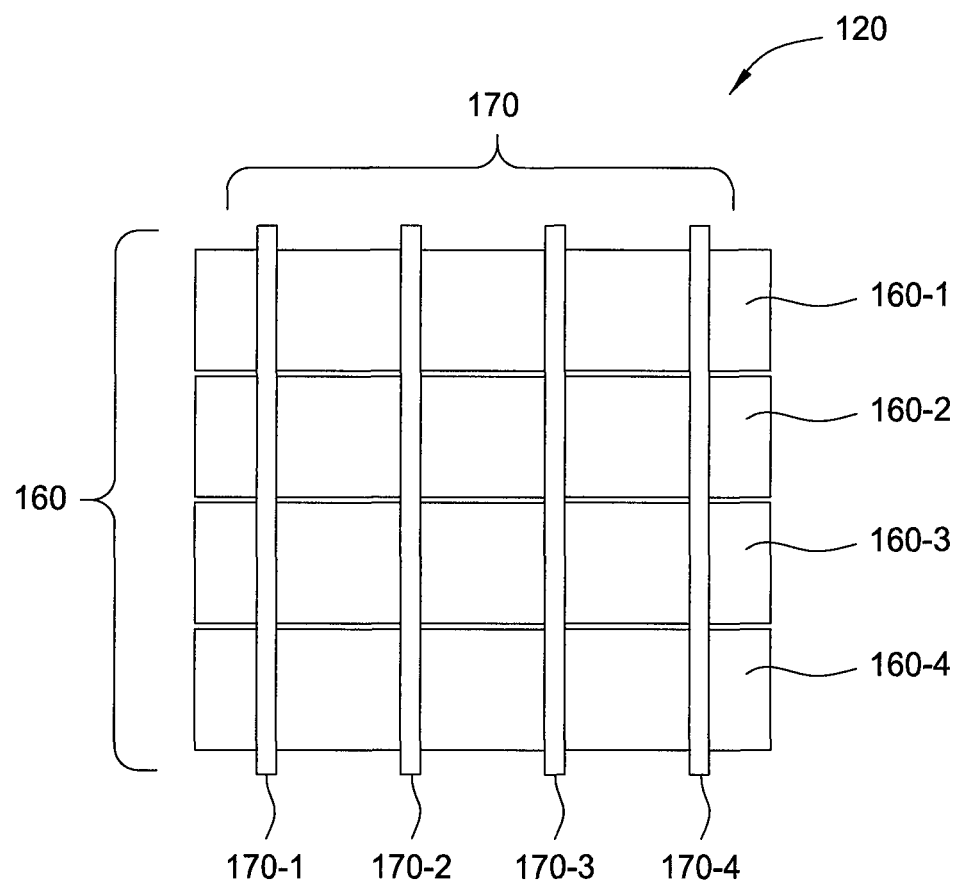
FIGS. 2A and 2B illustrate portions of exemplary patterns of sensing elements or capacitive sensing pixels, according to embodiments described herein.

FIG. 2A shows a portion of an exemplary pattern of sensing elements configured to sense in a sensing region 120 associated with the pattern, according to some embodiments. For clarity of illustration and description, FIG. 2A shows the sensing elements in a pattern of simple rectangles, and does not show various components. This pattern of sensing elements comprises a first plurality of sensor electrodes 160 (160-1, 160-2, 160-3, . . . 160-$n$), and a second plurality of sensor electrodes 170 (170-1, 170-2, 170-3, . . . 170-$n$) disposed over the first plurality of sensor electrodes 160. In one embodiment, this pattern of sensing elements comprises a plurality of transmitter electrodes 160 (160-1, 160-2, 160-3, . . . 160-$n$), and a plurality of receiver electrodes 170 (170-1, 170-2, 170-3, . . . 170-$n$) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In such embodiments, the transmitter electrodes and receiver electrodes may be disposed on separate layers of a common substrate. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. One or more receiver sensor electrodes 170 may be operated to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The baseline capacitance of a sensor device is the capacitive image associated with no input object in the sensing region. The baseline capacitance changes with the environment and operating conditions, and may be estimated in various ways. For example, some embodiments take "baseline images" when no input object is determined to be in the sensing region, and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

Figure 2B:
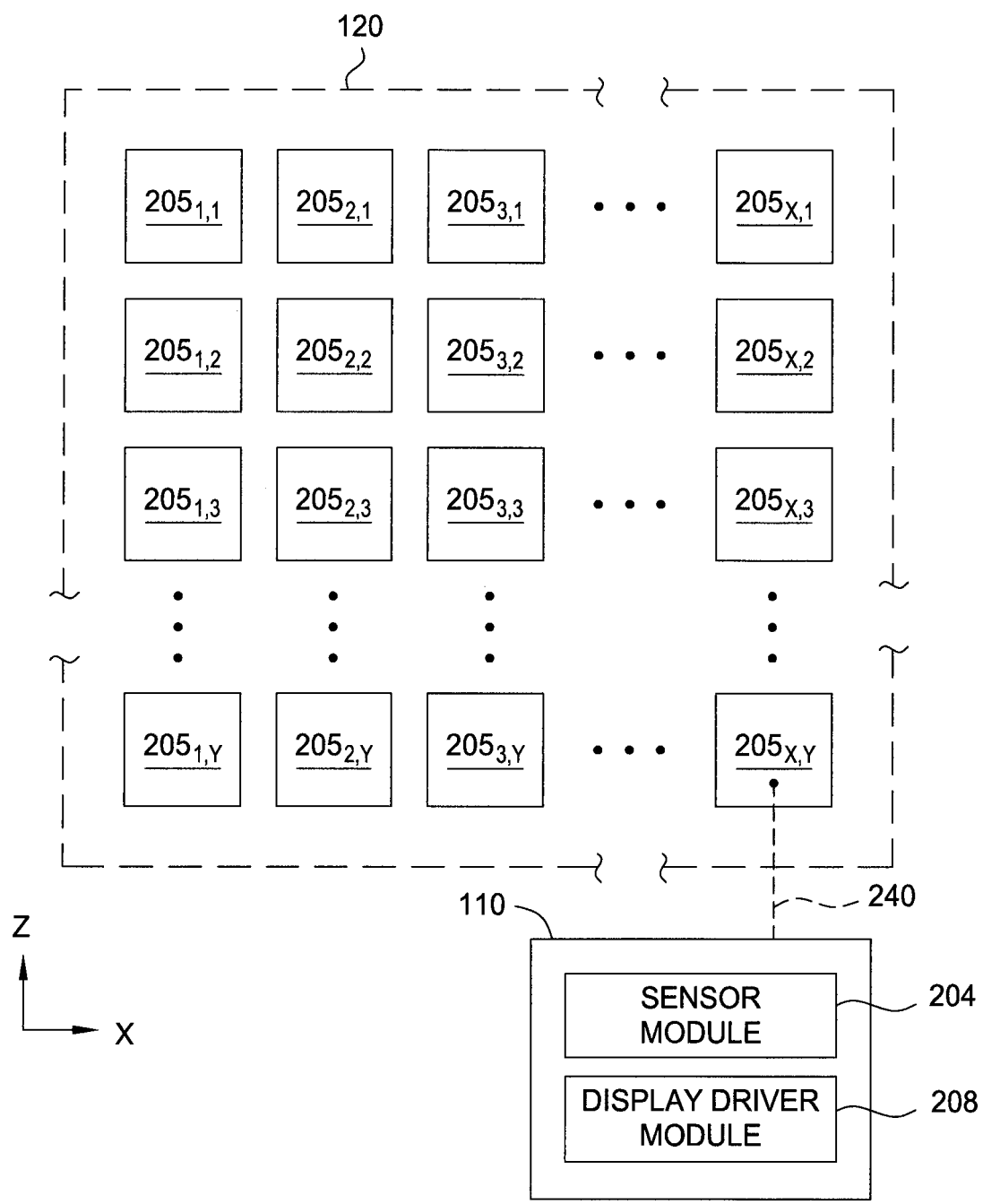

FIG. 2B shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110 and utilized to determine the presence (or lack thereof) of an input object in the sensing region 120.

In a first mode of operation, at least one sensor electrode within the capacitive sensing pixels 205 may be utilized to detect the presence of an input object via absolute sensing techniques. A sensor module 204 in processing system 110 is configured to drive a sensor electrode using a trace 240 in each pixel 205 with a modulated signal (i.e., a capacitive sensing signal) and measure a capacitance between the sensor electrode and the input object (e.g., free space or earth ground) based on the modulated signal, which is utilized by the processing system 110 or other processor to determine the position of the input object.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

One or more of the sensor electrodes configured as receiver sensor electrodes may be operated to acquire resulting signals. The resulting signals may be used to determine measurements of the capacitive couplings at the capacitive pixels 205.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Continuing to refer to FIG. 2B, the processing system 110 coupled to the sensing electrodes includes a sensor module 204 and optionally, a display driver module 208. In one embodiment the sensor module 204 comprises circuitry configured to drive a transmitter signal or a modulated signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired.

In various embodiments the sensor module 204 may comprise a receiver module that includes circuitry configured to receive a resulting signal with the sensing electrodes comprising effects corresponding to the transmitter signal during periods in which input sensing is desired. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system Comprises a first integrated controller comprising a display driver module 208 and one of a transmitter module or a receiver module and a second integrated controller comprising the other one of the transmitter module and receiver module.

The discussion above regarding FIGS. 2A and 2B describes various sensor arrangements suitable for sensing along a single axis. However, the techniques described herein can be applied to any sensor arrangement suitable to collect data along a single axis such as the top, bottom or sides of the sensing region 120 or the arrangement of the sensor electrodes. Moreover, the embodiments herein can be used with either transcapacitive or absolute sensing techniques in order to identify gestures as an input object (e.g., a finger) moves along an axis.

Figure 3:
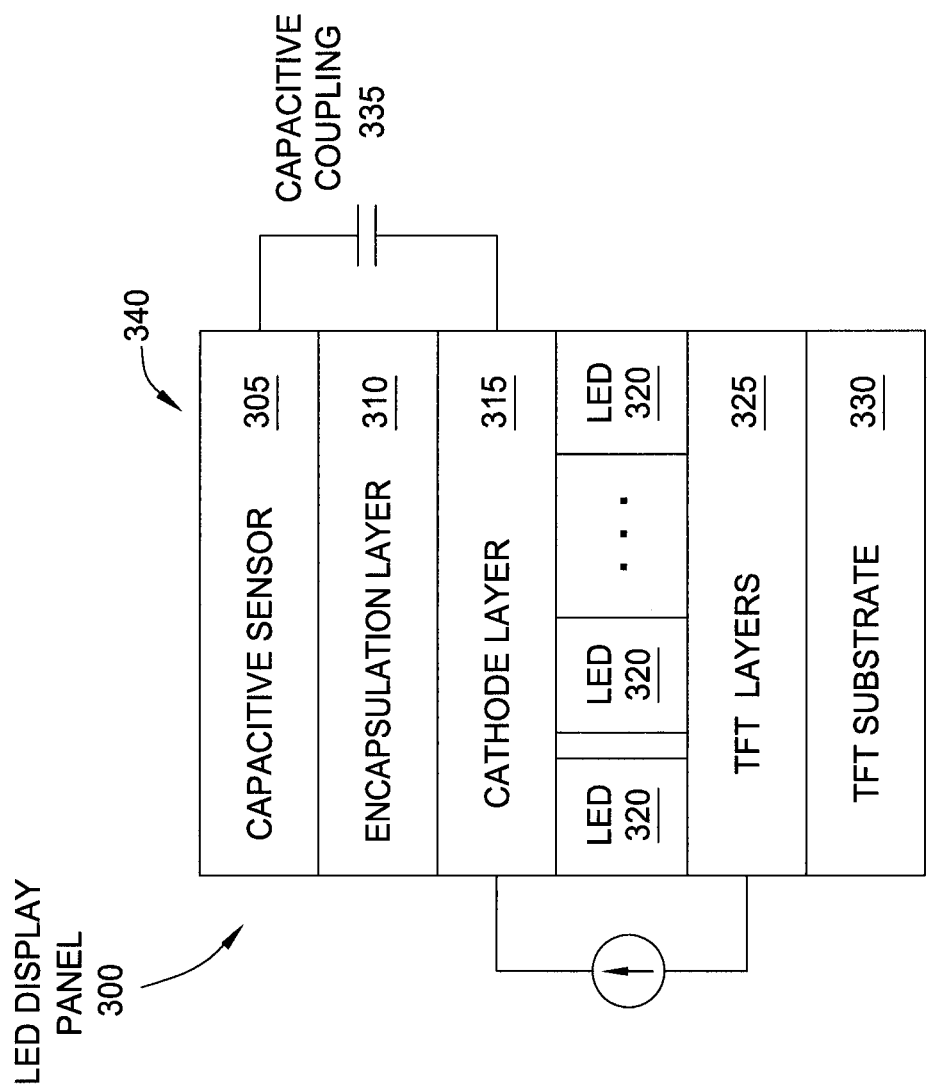
FIG. 3 illustrates a display panel with a cathode layer capacitively coupled to a capacitive sensor in accordance with an embodiment described herein.

FIG. 3 illustrates an LED display panel 300 with a cathode layer 315 capacitively coupled to a capacitive sensor 305 in accordance with an embodiment described herein. In this example, the LED display panel 300 includes an LED display that includes an encapsulation layer 310, the cathode layer 315, LEDs 320, thin-film-transistor (TFT) layers 325, and a TFT substrate 330. In one embodiment, the LED display panel 300 includes an organic LED (OLED) display. The encapsulation layer 310 can be made of any dielectric or nonconductive material that provides support to the display and is optically transparent so that the light emitted by the LEDs 320 can propagate therethrough.

In one embodiment, the cathode layer 315 is a solid conductive sheet that is coupled to a low voltage rail (VSS) of the display. However, in other embodiments, the cathode layer 315 may be patterned to form individual electrodes—e.g., rectangles or other shapes that extend across the display panel 300. Like the encapsulation layer 310, the material in the cathode layer 315 is optically transparent, but unlike the encapsulation layer 310, the cathode layer 315 may be conductive so that current can flow in this layer. For example, the conductive material in the cathode layer 315 may be indium-tin oxide (ITO) or any other suitable transparent conductor.

The LEDs 320 define different pixels in the display panel 300. For example, each LED 320 in FIG. 3 may represent a single color (e.g., red, green, or blue). The LEDs 320 emit light when current flows through them, for example, when current flows between the LEDs 320 and the cathode layer 315. The LEDs 320 are controlled by logic in the TFT layers 325 which can include various transistors, gate lines, sources line, capacitors, and a high voltage rail (VDD) which are disposed on a TFT substrate 330. Unlike the cathode layer 315 and the encapsulation layer 310, the TFT layers 325 and TFT substrate 330 may not be optically transparent.

In this embodiment, the capacitive sensor 305 is disposed on the layers forming the display portion of the LED display panel 300 in a vertical stack. Specifically, the capacitive sensor 305 contacts the encapsulation layer 310 which electrically insulates sensor electrodes in the capacitive sensor 305 from the conductive cathode layer 315. In this embodiment, the capacitive sensor 305 is a discrete sensor which is separate from the layers forming the display. That is, none of the sensor electrodes used to perform capacitive sensing is also used for updating the display. Put differently, in this embodiment, the capacitive sensor is a discrete sensor or an on-cell sensor rather than an in-cell sensor where one or more electrodes used for capacitive sensing are also used for updating the display. Moreover, the capacitive sensor 305 is substantially transparent so that the light emitted by the LEDs 320 can be seen at a top surface 340 of the display panel 300. In one embodiment, the sensor electrodes in the capacitive sensor 305 may be formed from ITO.

Although the encapsulation layer 310 prevents direct electrical connection between the capacitive sensor 305 and the cathode layer 315, FIG. 3 illustrates a capacitive coupling 335 between the capacitive sensor 305 and the cathode layer 315. This capacitive coupling 335 is not a discrete capacitor but rather is formed inherently because of the close proximity of the conductive material in the cathode layer 315 and the conductive material in the capacitive sensor 305. Although in display panel 300 the cathode layer 315 is capacitively coupled to the capacitive sensor 305, the embodiments herein are not limited to such. In other LED display panels a different transparent conductive layer (e.g., an anode layer) may be formed closest to the discrete capacitive sensor 305, in which case that layer may be capacitively coupled to the capacitive sensor 305 as shown in FIG. 3.

As a result of the capacitive coupling 335, voltage changes on the cathode layer 315 affect the voltages on the capacitive sensor 305 which in turn can affect the capacitive sensing signals measured using the sensor 305. Put differently, the current flowing in the cathode layer 315 as a result of operating the LED display can inject noise or interference into the capacitive sensor 305 because of the capacitive coupling 335. Thus, if the capacitive sensor 305 acquires capacitive sensing signals at the same time current is flowing through the cathode layer 315, the cathode layer 315 can introduce noise or interference in these signals. Although a cathode layer 315 is shown in FIG. 3, the discussion and structure above also apply when the cathode layer 315 is replaced with an anode layer (e.g., when an OLED is a bottom emission type and the anode layer is part of a common conductive surface). Put differently, the capacitive sensor 305 can be capacitively coupled to the anode layer which injects display noise in the sensor 305 when current is flowing in the anode layer. In any case, the embodiments herein can be used when a discrete capacitive sensor 305 is capacitively coupled to any conductive layer in the display.

Figure 4:
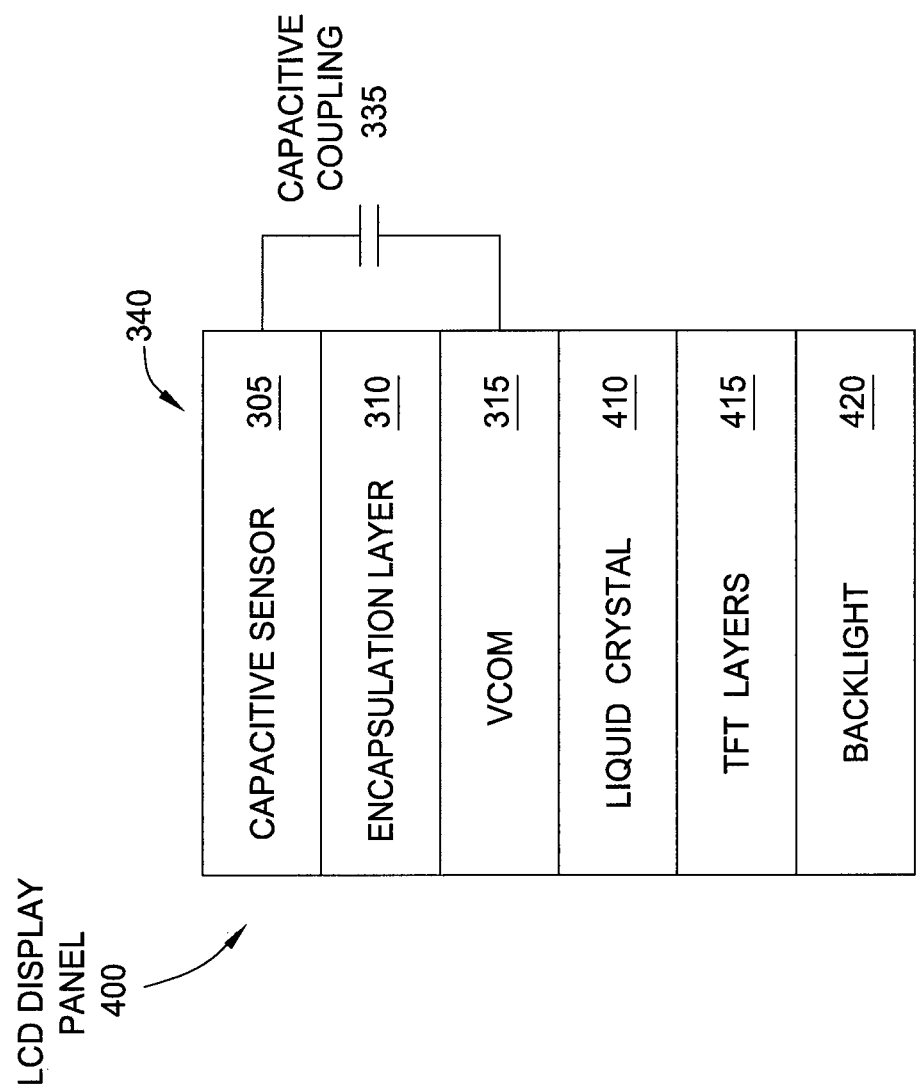
FIG. 4 illustrates a display panel with a Vcom layer capacitively coupled to a capacitive sensor in accordance with an embodiment described herein.

FIG. 4 illustrates a LCD panel 400 with a Vcom layer 405 (e.g., a transparent conductive layer) capacitively coupled to the capacitive sensor 305 in accordance with an embodiment described herein. In FIG. 4, the capacitive sensor 305 can be any of the variants of a discrete sensor as described above. The sensor 305 is disposed on the encapsulation layer 310 which prevents the sensor electrodes in the capacitive sensor 305 from being directly electrically coupled to the Vcom layer 405. Although the encapsulation layer 310 prevents direct electrical connection between the capacitive sensor 305 and the Vcom layer 405, FIG. 4 illustrates the capacitive coupling 335 between the capacitive sensor 305 and the Vcom layer 405. This capacitive coupling 335 is not a discrete capacitor but rather is formed inherently because of the close proximity of the conductive material in the Vcom layer 405 and the conductive material in the capacitive sensor 305. Although in the LCD panel 400 the Vcom layer 405 is capacitively coupled to the capacitive sensor 305, the embodiments herein are not limited to such. In other LCD panels a different transparent conductive layer may be formed closest to the discrete capacitive sensor 305, in which case that layer may be capacitively coupled to the capacitive sensor 305.

As a result of the capacitive coupling 335, voltage changes on the Vcom layer 405 affect the voltages on the capacitive sensor 305 which in turn can affect the capacitive sensing signals measured by the sensor 305. Put differently, the current flowing in the Vcom layer 405 as a result of operating the LCD panel 400 can cause noise or interference on the capacitive sensor 305 because of the capacitive coupling 335. In one embodiment, the Vcom layer 405 includes Vcom electrodes formed from a transparent material—e.g., ITO—which are used for driving voltages across display material (e.g., liquid crystal 410) in the panel 400. For example, the Vcom electrodes may be held at a reference voltage when updating the liquid crystal 410. Regardless of how the Vcom layer 405 is used when updating the display, changes in voltages or currents in the Vcom layer 405 can interfere with the capacitive signals being measured using the capacitive sensor 305.

Figure 5:
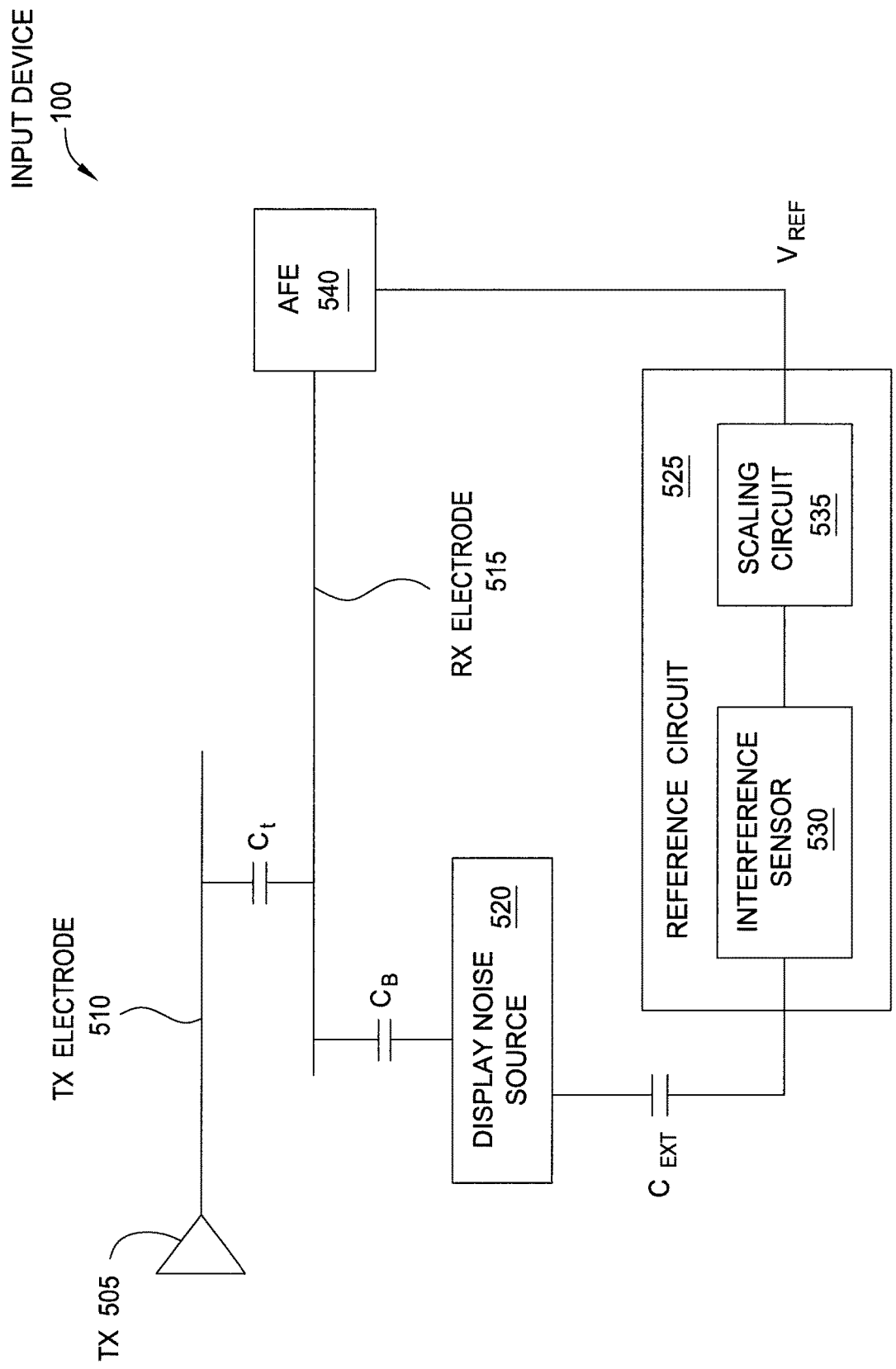
FIG. 5 illustrates a reference circuit that generates a reference voltage for an analog front end that mitigates display noise in a capacitive sensor in accordance with an embodiment described herein.

FIG. 5 illustrates a reference circuit 525 that generates a reference voltage for an AFE 540 that mitigates display noise in a capacitive sensor in accordance with an embodiment described herein. FIG. 5 illustrates the input device 100 which includes a transmitter (TX) 505 that drives a modulated capacitive sensing signal onto a TX electrode 510 which is capacitively coupled (via capacitance $C_T$) to a receiver (RX) electrode 515. In one embodiment, the TX electrode 510 and the RX electrode 515 are arranged in the bars and stripe arrangement shown in FIG. 2A, however, these electrodes can be arranged in any fashion to perform transcapacitive sensing to detect the presence of an input object.

The RX electrode 515 is coupled to the AFE 540 which generates capacitive sensing measurements using resulting signals generated on the RX electrode 515 in response to the TX 505 driving a modulated signal onto the TX electrode 510. Although not shown, an output of the AFE 540 can be coupled to digital circuitry (e.g., an analog-to-digital converter (ADC)) to generate digital signals representing the capacitive sensing measurements.

In FIG. 5, the RX electrode 515 is capacitive coupled to a display noise source 520 in the display (e.g., an OLED display or a LCD). The display noise source 520 could be a cathode or anode layer as shown in FIG. 3 or a Vcom layer as shown in FIG. 4. The background capacitance ($C_B$) between the display noise source 520 and the RX electrode 515 represents an inherent capacitance between the conductive RX electrode 515 and conductive material in the display noise source 520 similar to the capacitive coupling 335 in FIGS. 3 and 4.

The reference circuit 525 generates a reference voltage ($V_{REF}$) for mitigating the negative effect the display noise source 520 has on the capacitive sensing measurements generated by the AFE 540. Put differently, $V_{REF}$ helps to mitigate the noise injected onto the RX electrode 515 from the display noise source 520 because of the capacitance $C_B$. Although the display noise source 520 is shown as being capacitive coupled to the RX electrode 515, the source 520 may also be capacitively coupled to the TX electrode 510.

The input device 100 includes a capacitor $C_{EXT}$ which is coupled to the display noise source 520 on a first end and coupled to the reference circuit 525 at a second end. Unlike the capacitances $C_T$ and $C_B$, the capacitor $C_{EXT}$ is a discrete capacitor that is added to the input device 100 in order to capacitively couple the display noise source 520 to the reference circuit 525. In one embodiment, the capacitor $C_{EXT}$ may be formed in an integrated circuit or be attached to a substrate—e.g., a flex printed circuit board (PCB). For example, the capacitor $C_{EXT}$ can be on-chip programmable capacitor which can be programmed, along with the scaling circuit 535, to match the capacitance $C_B$ which can vary depending on the display panel in the input device 100.

Because of the capacitor $C_{EXT}$, the reference circuit 525 is affected by the noise generated by the display noise source 520 in a similar manner as the RX electrode 515. In one embodiment, the capacitor $C_{EXT}$ has the same value as the background capacitance $C_B$. That is, the background capacitance $C_B$ can be measured or simulated to identify its value and a system designer can add the capacitor $C_{EXT}$ to the input device 100 has an equal value. However, as described below, it is not critical that the background capacitance $C_B$ be the same as the capacitor $C_{EXT}$.

The reference circuit 525 includes an interference sensor 530 and a scaling circuit 535. As shown, interference sensor 530 is coupled to the capacitor $C_{EXT}$ and generates an interference measurement which is outputted to the scaling circuit 535 which scales the interference measurement to output the reference voltage. In turn, the reference voltage controls the operation of the AFE 540 to mitigate the noise injected by the display noise source 520.

Figure 6:
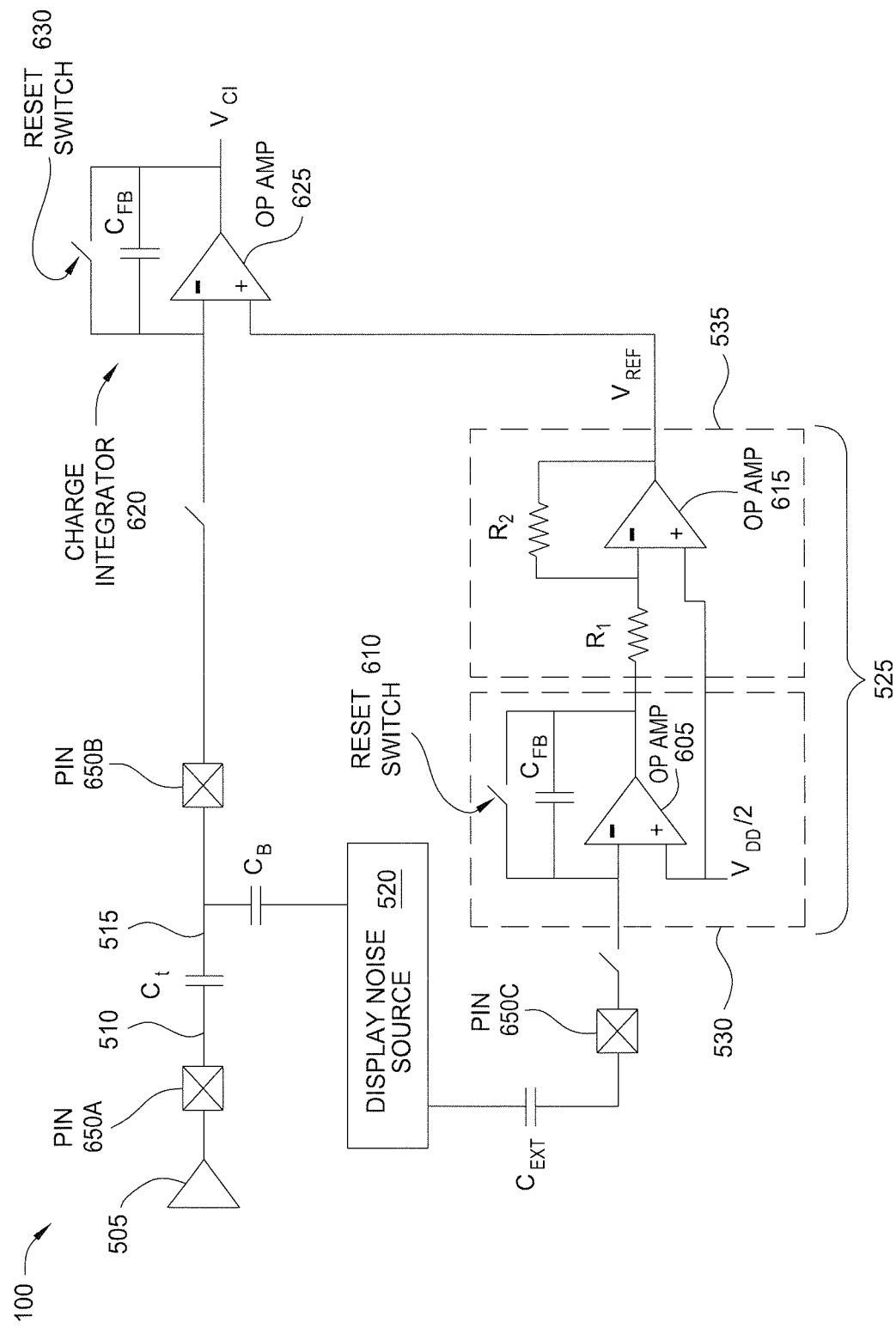
FIG. 6 illustrates an interference sensor and scaling circuit for controlling a reference voltage of a receiver in accordance with an embodiment described herein.

FIG. 6 illustrates the interference sensor 530 and the scaling circuit 535 for controlling a reference voltage $V_{REF}$ of a receiver in accordance with an embodiment described herein. The input device 100 in FIG. 6 illustrates a more detailed version of the interference sensor 530 and the scaling circuit 535 shown in FIG. 5. In this embodiment, the interference sensor 530 includes an integrator for generating the interference measurements. The integrator includes an operational amplifier (op amp) 605 which include a feedback capacitor $C_{FB}$ and a reset switch 610 in a feedback loop between the output of the op amp 605 and its inverting input (−). The non-inverting input (+) of the op amp is coupled to a DC voltage—i.e., VDD/2.

In one embodiment, the integrator measures a change in charge across the capacitor $C_{EXT}$ to form a noise measurement, which can be an on-chip programmable capacitor or a discrete capacitor mounted on a flex PCB. Because the integrator is not capacitively coupled to the TX electrode 510, the noise measurement may not be affected by the capacitive sensing signal. Put differently, the integrator in the interference sensor 530 measures only the noise of the source 520 rather than the capacitive coupling between the TX electrode 510 and the RX electrode 515 and the input object.

The output of the op amp 605 is scaled by the scaling circuit 535 which includes a first resistor $R_1$ coupled to an inverting input of an op amp 615 while the non-inverting input is coupled to the reference voltage VDD/2. A resistor $R_2$ is coupled in the feedback loop between the output of the op amp 615 and the inverting input. The output of the op amp 615 is the reference voltage $V_{REF}$ which represents the noise or interference generated by the display noise source

520. That is, the reference voltage $V_{REF}$ changes according to the amount of noise generated by the display noise source 520.

The reference voltage $V_{REF}$ is coupled to the non-inverting input of an op amp 625 in the charge integrator 620. That is, unlike in traditional AFEs where the non-inverting input is coupled to a constant reference voltage (e.g., VDD/2), here the op amp 625 is coupled to the reference voltage $V_{REF}$ which changes according to the noise or interference generated by the display noise source 520. In this embodiment, the charge integrator 620 includes a feedback capacitor $C_{FB}$ and a reset switch 630 coupled in a feedback loop of the op amp 625 similar to the integrator in the interference sensor 530. In one embodiment, the feedback capacitor $C_{FB}$ may have the same value in the charge integrator 620 as the feedback capacitor $C_{FB}$ in the interference sensor 530.

Because the op amp 625 is coupled to the reference voltage $V_{REF}$, the charge measured by the integrator 620 is not affected (or at least, affected less than when the op amp 625 is coupled to VDD/2) by the noise injected by the display noise source 520 onto the RX electrode 515. Although not shown, the output of the charge integrator 620 can be coupled to an ADC which outputs digital signals corresponding to the capacitive measurements. One advantage of removing the interference generated by the display noise source 520 using the analog circuitry shown in FIG. 6 is that the dynamic range of the receiver channels (e.g., the AFEs coupled to RX electrodes) is increased. That is, the present embodiments cancel the interference at the front-end so that the receivers are spared from either having to perform narrowband filtering to reject out-of-band interference or having to attenuate the signals in the front-end before filtering to avoid receiver saturation. For example, narrowband filtering is limited in its effectiveness if the interference is in-band or close to the signal band of the modulated capacitive sensing signal driven by the TX 505. Moreover, attenuating the signals at the front-end reduces the signal-to-noise ratio (SNR) as the signal is attenuated and noise downstream in the receiver is amplified when it is referred to the input. Performing interference cancellation as close to the source as possible as described herein not only relaxes the filtering requirement but also obviates a need to attenuate the signal in order to achieve higher receiver SNR.

In one embodiment, the reference voltage outputted by the reference circuit 525 is a replica of the interference, which is matched in gain, to the interference coupled to the charge integrator 620 in the AFE. Although only one receiver channel is shown, the output of the reference circuit 525 can be sent to the AFEs in the all of the receiver channels. That is, only one instance of the reference circuit 525 can be used to mitigate noise injected by the display noise source 520 into all the RX electrodes in the input device 100.

In one embodiment, the ratio of the resistances of the resistor R1 to the resistor R2 (also expressed as R1/R2) in the scaling circuit 535 is selected to achieve gain matching to the interference in the receiver channel that includes the RX electrode 515 and the charge integrator 620. The reference voltage $V_{REF}$ can be represented by the following equation where the noise generated by the display noise source 520 is represented by $V_n$:

$$V_{REF} = \frac{V_{DD}}{2} + \frac{C_{EXT}}{C_{FB}} \frac{R_1}{R_2} V_n = \frac{V_{DD}}{2} + G_n V_n \text{ where } G_n = \frac{C_{EXT}}{C_{FB}} \frac{R_1}{R_2} \quad (1)$$

The output voltage $V_{CI}$ of the charge integrator 620 can be expressed as:

$$V_{CI} = \frac{V_{DD}}{2} + G_n V_n - (V_n - G_n V_n) \frac{C_B}{C_{FB}} \quad (2)$$

Equation 2 can be simplified into the following:

$$V_{CI} = \frac{V_{DD}}{2} + V_n(G_n + G_n G - G) \text{ where } G = \frac{C_B}{C_{FB}} \quad (3)$$

The condition to remove the noise voltage $V_n$ from the output of the charge integrator 620 is expressed as:

$$G_n = \frac{G}{1+G} \quad (4)$$

As shown in Equation 3, the value of G is set by the ratio of the background capacitance $C_B$ and the feedback capacitor $C_{FB}$ (i.e., $C_B/C_{FB}$) in the interference sensor 530. Because the background capacitance $C_B$ can be measured (i.e., is known) and the feedback capacitor $C_{FB}$ can be whatever value set by the system designer, the value of G is known which can be used to solve for the value of $G_n$ in FIG. 4. For example, if the background capacitance is 100 pF and the feedback capacitor is 10 pF, then the value of $G_n$ is 10/11. As shown by the representation of $G_n$ in Equation 1, the ratio of the resistances of resistor R1 to resistor R2 is equal to the value of $G_n$ times the ratio of the external capacitor $C_{EXT}$ to the feedback capacitor $C_{FB}$. If the value of the feedback capacitor $C_{FB}$ is the same as the background capacitance $C_{FB}$ (i.e., 100 pF), then the ratio of the resistances of resistor R1 to resistor R2 is 1/11. Thus, the system designer can choose any ratio of the resistances of the resistor R1 to the resistor R2 that is equal to 1/11, and as a result, the scaling circuit 535 will properly scale the reference voltage $V_{REF}$ to cancel the interference generated by the display noise source 520 in the receiver channel. Put differently, the ratio of the resistances of the resistor R1 to the resistor R2 can be selected such that the reference voltage $V_{REF}$ is scaled to match the interference caused by the display noise source 520 at the charge integrator 620—i.e., the front-end of the receiver.

The pins 650 illustrate connection points between a panel or substrate (e.g., a flex PCB or display panel) to a processing system (e.g., one or more integrated circuits). In FIG. 6, the pin 650A connects the TX 505 to the TX electrode 510 which, along with the RX electrode 515, is disposed on a panel that includes the display (e.g., an OLED or LCD) that has the display noise source 520. The pin 650B couples the RX electrode 515 to the receiver channel that includes the charge integrator 620. The pin 650C couples the capacitor $C_{EXT}$ to the reference circuit 525. In one embodiment, the reference circuit 525, the charge integrator 620, and the TX 505 may be disposed on the same integrated circuit in the processing system or may be disposed on different integrated circuits.

Figure 7:
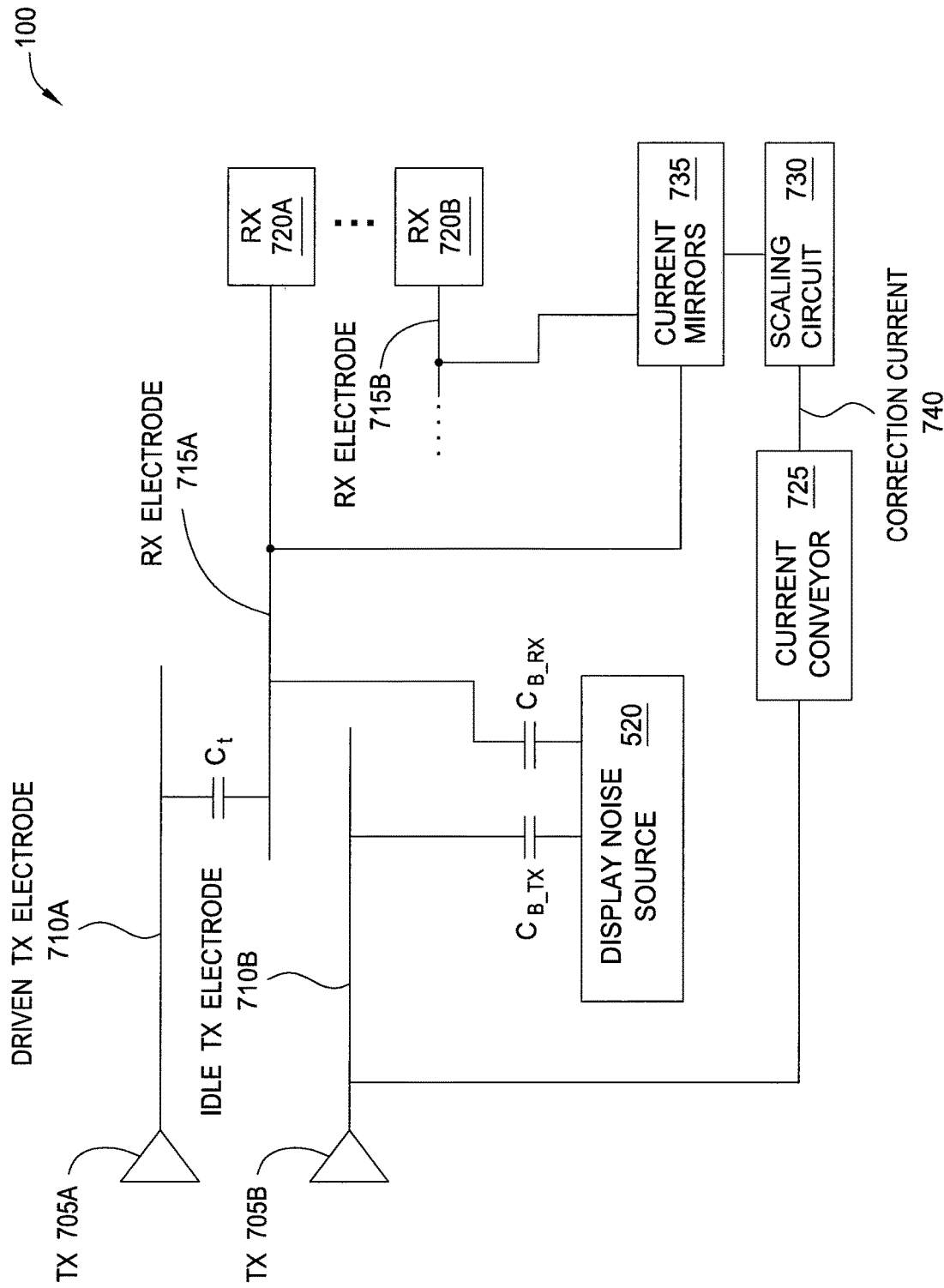
FIG. 7 illustrates a current conveyor for mitigating display noise in a capacitive sensor in accordance with an embodiment described herein.

FIG. 7 illustrates a current conveyor 725 for mitigating display noise in a capacitive sensor in accordance with an embodiment described herein. Instead of using the reference voltage $V_{REF}$ to mitigate the interference in the front-end of the AFE, in FIGS. 7 and 8, a current generated by the current conveyor 725 is used to mitigate the interference caused by the display noise source 520. To do so, the current conveyor 725 outputs a correction current 740 that is generated in response to noise injected into an idle TX electrode 710B. That is, when performing transcapacitive sensing, one or more of the TX electrodes are idle—i.e., are not used to drive the modulated capacitive sensing signal. For example, the input device 100 may instruct only one of the transmitters 705 to drive the capacitive sensing signal onto corresponding TX electrodes or a sub-set of the transmitters 705 to drive the signal in parallel if code divisional multiplexing (CDM) is used. As such, at least one TX electrode in the input device 100 is idle.

One or more of the idle TX electrodes are selectively coupled to the current conveyor 725. That is, although not shown in FIG. 7, the input device 100 may include selection logic for selectively coupling the current conveyor 725 to one of the idle TX electrodes 710B but not to a driven TX electrode 710A. Which ones of the TX electrodes 710 are idle and which ones are driven changes over time. In one embodiment, the output of the idle TX electrode 705B is electrically floating.

The display noise source 520 is capacitively coupled to both the RX electrodes 715 (as shown by the capacitance $C_{B\_RX}$) and the TX electrodes 710 (as shown by the capacitance $C_{B\_TX}$). As such, the display noise source 520 injects noise into these electrodes. In this embodiment, it is assumed that the noise injected into the RX electrodes 715 and the TX electrodes 710 is substantially the same. However, in other embodiments, the output of the current conveyor 725 can be scaled if the noise coupling is different for the RX electrodes 715 when compared to the noise injected into the TX electrodes 710.

The noise injected by the display noise source 520 onto the idle TX electrode 710B is detected by the current conveyor 725 which outputs the correction current 740 to a scaling circuit 730 or a gain adjuster for scaling the correction current 740 when the coupling capacitances between the TX electrodes and the RX electrodes are unequal. That is, the scaling circuit 730 can compensate when the capacitances $C_{B\_TX}$ and $C_{B\_RX}$ are unequal such that the correction current 740 cancels out the noise current injected into the RX electrode 715A by the display noise source 520.

Current mirrors 725 can buffer and replicate the scaled current received from the scaling circuit 730. For example, the current mirrors 735 can replicate the scaled current to transmit respective scaled currents to each receiver channel (i.e., RXs 720) in the input device 100. That is, using the plurality of current mirrors 735, the input device 100 can replicate the scaled correction current 740 to cancel the noise injected by the display noise source 520 into each RX 720 when sensing using the RX electrodes 715.

One disadvantage of using FIG. 7 to mitigate the noise from the display noise source 520 relative to the embodiments shown in FIGS. 5 and 6 is that the correction current 740 is replicated by the current mirrors 735 so that the current 740 can be transmitted to each RX 720. In contrast, in FIG. 6, the reference voltage $V_{REF}$ can be outputted to each RX (e.g., each charge integrator 620) without using the current mirrors 735 which may mean the reference circuit 525 occupies less area in the processing system. However, one advantage of using FIG. 7 relative to the embodiments shown in FIGS. 5 and 6 is that it may be difficult or impracticable to place a capacitor $C_{EXT}$ that couples the display noise source 520 to the reference circuit 525 in which case the embodiment shown in FIG. 7 may be preferred.

In one embodiment, the current conveyor 725, the scaling circuit 730, the current mirrors 735, and the RXs 720 are disposed on the same integrated circuit in the processing system. However, in another embodiment, these components may be disposed on separate integrated circuits in the processing system. Moreover, the TXs 705 may be disposed on the same integrated circuit or circuits as the current conveyor 725 and the RXs 720.

In an alternative embodiment, the input device 100 replicates the noise current and monitors the noise current using an idle receiver channel (e.g., RX 720B). Such a detective mechanism of the interference source can be employed to provide information for frequency gear shifting or other interference mitigation methods.

Figure 8:
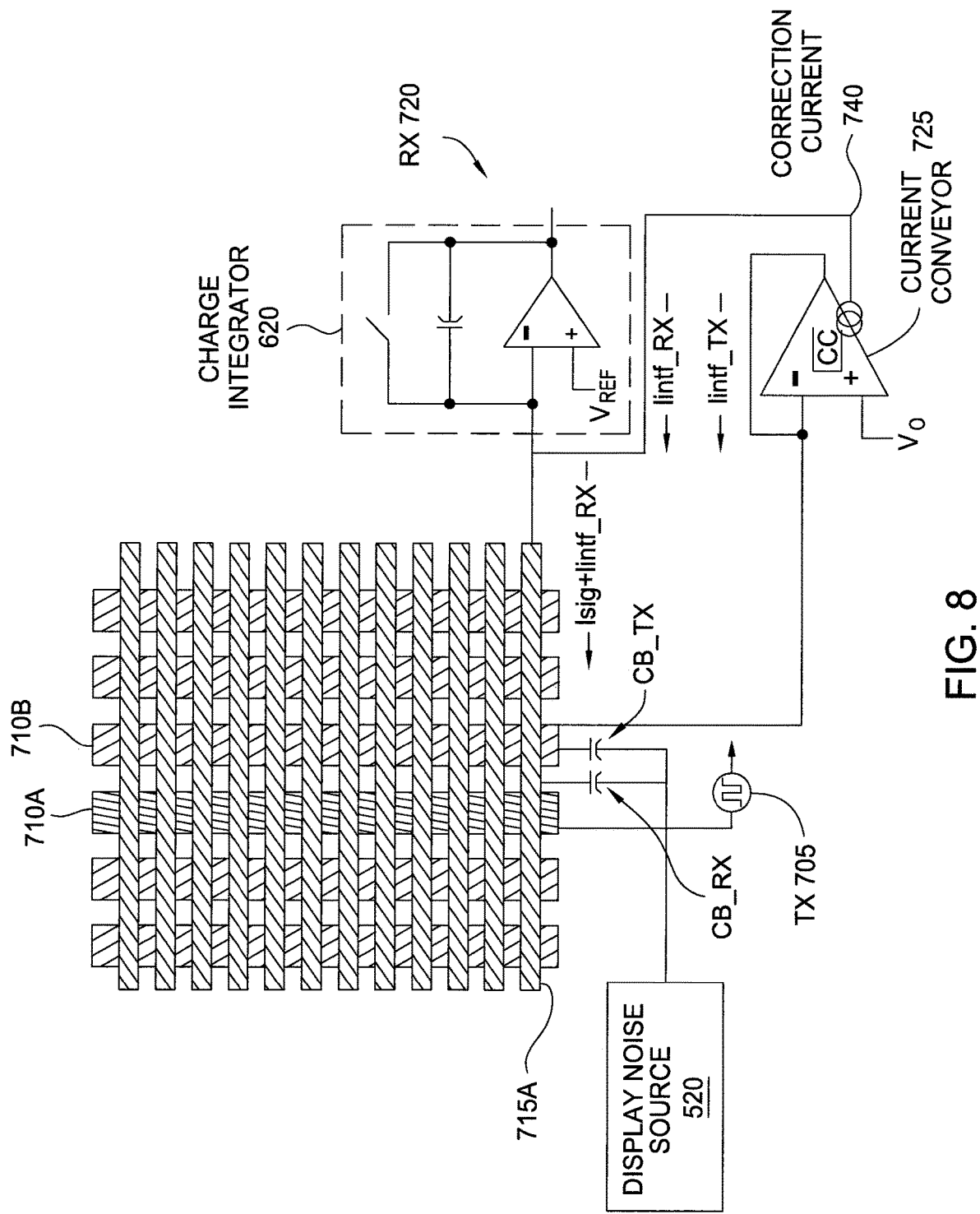
FIG. 8 illustrates a current conveyor for mitigating display noise in a capacitive sensor in accordance with an embodiment described herein.

FIG. 8 illustrates the current conveyor 725 for mitigating display noise in a capacitive sensor in accordance with an embodiment described herein. FIG. 8 illustrates a bars-and-stripe arrangement of the TX and RX electrodes similar to what is shown in FIG. 2A. The TX 705 is currently driving the capacitive sensing signal onto the driven TX electrode 710A while the idle TX electrode 710B is not being driven. Moreover, both the idle TX electrode 710B and the RX electrode 715A are capacitively coupled to the display noise source 520 which injects interference onto both of these electrodes. Although FIG. 8 illustrates selectively coupling the current conveyor 725 to one idle TX electrode 710B, in other embodiments the current conveyor 725 can be coupled to multiple idle TX electrodes 710 in order to measure the interference generated by the display noise source 520 on the capacitive sensor.

The current conveyor 725 has a first input (−) coupled to the idle TX electrode 710B while a second input (+) is coupled a constant voltage $V_O$. A first output of the current conveyor 725 forms a feedback loop with the first input (labeled Iintf_TX). A second output of the current conveyor 725 generates the correction current 740 (i.e., Iintf_RX). Although the correction current 740 can be coupled to a scaling circuit and multiple current mirrors as shown in FIG. 7, in this example, the second output is coupled to a common node with the inverting input of the op amp in the charge integrator 620 and with the RX electrode 715A. In one embodiment, the correction current 740 represents the current sourced by, or sunk by, the current conveyor 725 in order to cancel the noise current injected by the display noise source 520 onto the RX electrode 715A. As a result, the charge measurement captured by the charge integrator 620 in the receiver is not affected by the display noise source 520. Unlike in FIGS. 5 and 6, here the reference voltage $V_{REF}$ coupled to the op amp in the charge integrator 620 is held at a constant voltage (e.g., $V_{DD}/2$) rather than changing depending on the display noise source 520.

For simplicity, FIG. 8 illustrates only one RX 720. However, the input device may include multiple RXs that are coupled to the RX electrodes. In one embodiment, each RX electrode is coupled to a respective RX. In another embodiment, the input device includes selection logic (e.g., a multiplexer) that permits a group of RX electrodes to share the same RX.

FIGS. 7 and 8 provide a current-based approach to mitigate the negative effects from the display noise source 520 at the analog front end of the receiver in each receiver channel. The input devices 100 shown in FIGS. 7 and 8 cancel the interference at the front-end so that the receivers are spared from either performing narrowband filtering to reject out-of-band interference or attenuating the signals in the front-end before filtering to avoid receiver saturation.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
   a display panel comprising a conductive layer;
   a plurality of sensor electrodes disposed on the display panel, wherein the plurality of sensor electrodes establishes a sensing region of the input device;
   a capacitor coupled at a first end to the conductive layer, wherein a capacitance value of the capacitor corresponds to a value of a background capacitance formed between a first sensor electrode of the plurality of sensor electrodes and the conductive layer;
   a reference circuit having an input coupled to a second end of the capacitor via a switching mechanism configured to selectively coupled and decouple the capacitor from the reference circuit, wherein the reference circuit comprises:
      an interference circuit comprising a feedback capacitor, the interference circuit is configured to determine a measurement of noise generated by the conductive layer; and
      a scaling circuit comprising a first resistor and a second resistor, the scaling circuit is coupled to an output of the interference circuit and is configured to scale the measurement of noise at least partially based on a product of a ratio of a resistance of the first resistor to a resistance of the second resistor and a ratio of the capacitance value of the capacitor to a capacitance value of the feedback capacitor to generate a reference voltage; and
   an analog front end (AFE) coupled to the first sensor electrode and to an output of the scaling circuit, wherein the AFE is configured to generate a capacitive measurement corresponding to the first sensor electrode using the reference voltage.

2. The input device of claim 1, further comprising:
   a discrete capacitive sensor comprising the plurality of sensor electrodes, wherein the discrete capacitive sensor is disposed in a vertical stack with the display panel and is separated from the conductive layer by a dielectric layer.

3. The input device of claim 2, wherein the discrete capacitive sensor includes transmitter electrodes and receiver electrodes, wherein the transmitter electrodes extend in a first direction different from a second direction in which the receiver electrodes extend.

4. The input device of claim 3, wherein the receiver electrodes are coupled to a plurality of AFEs that includes the AFE, wherein determining the measurement of noise using the reference circuit is performed in parallel with generating capacitive measurements corresponding to the receiver electrodes using the plurality of AFEs.

5. The input device of claim 1, wherein the second resistor is arranged in a feedback loop of an operational amplifier, and wherein the output of the operational amplifier is configured to generate the reference voltage.

6. The input device of claim 5, wherein the first resistor is coupled between an inverting input of the operational amplifier and the output of the interference circuit.

7. The input device of claim 1, wherein the AFE includes an integrator, wherein the reference voltage is coupled to a first input of an operational amplifier in the integrator and the first sensor electrode is coupled to a second input of the operational amplifier.

8. The input device of claim 1, wherein the capacitance value of the capacitor is equal to the value of the background capacitance.

9. A processing system configured to couple to a display panel and to a plurality of sensor electrodes configured to establish a sensing region, the processing system comprising:
   a reference circuit configured to couple to a capacitor via a switching mechanism configured to selectively coupled and decouple the capacitor from the reference circuit, wherein the capacitor capacitively couples the reference circuit to a conductive layer in the display panel, wherein a capacitance value of the capacitor corresponds to a value of a background capacitance formed between a first sensor electrode of the plurality of sensor electrodes and the conductive layer, and wherein the reference circuit comprises:
      an interference circuit comprising a feedback capacitor, the interference circuit is configured to determine a measurement of noise generated by the conductive layer; and
      a scaling circuit comprising a first resistor and a second resistor, the scaling circuit is coupled to an output of the interference circuit and is configured to scale the measurement of noise at least partially based on a product of a ratio of a resistance of the first resistor to a resistance of the second resistor and a ratio of the capacitance value of the capacitor to a capacitance value of the feedback capacitor to generate a reference voltage; and
   an analog front end (AFE) coupled an output of the scaling circuit, wherein the AFE is configured to couple to the first sensor electrode, and wherein the AFE is configured to generate a capacitive measurement corresponding to the first sensor electrode using the reference voltage.

10. The processing system of claim 9, wherein the plurality of sensor electrodes are part of a discrete capacitive sensor, wherein the discrete capacitive sensor is disposed in a vertical stack with the display panel and is separated from the conductive layer by a dielectric layer, wherein the discrete capacitive sensor includes transmitter electrodes and receiver electrodes, wherein the transmitter electrodes extend in a first direction different from a second direction in which the receiver electrodes extend.

11. The processing system of claim 10, wherein the receiver electrodes are coupled to a plurality of AFEs that includes the AFE, wherein determining the measurement of noise using the reference circuit is performed in parallel with generating capacitive measurements corresponding to the receiver electrodes using the plurality of AFEs.

12. The processing system of claim 9, wherein the second resistor is arranged in a feedback loop of an operational amplifier, wherein the output of the operational amplifier is configured to generate the reference voltage, and wherein the first resistor is coupled between an inverting input of the operational amplifier and the output of the interference circuit.

13. The processing system of claim 9, wherein the AFE includes an integrator, wherein the reference voltage is coupled to a first input of an operational amplifier in the integrator and the first sensor electrode is coupled to a second input of the operational amplifier.

14. The processing system of claim 9, wherein the capacitance value of the capacitor is equal to the value of the background capacitance.

* * * * *